United States Patent [19]

Dohi et al.

[11] Patent Number: 5,638,362
[45] Date of Patent: Jun. 10, 1997

[54] CORRELATION DETECTOR AND COMMUNICATION APPARATUS

[75] Inventors: Tomohiro Dohi, Yokohama; Mamoru Sawahashi, Yokosuka; Fumiyuki Adachi, Yokohama, all of Japan

[73] Assignee: NTT Mobile Communications Network, Inc., Tokyo, Japan

[21] Appl. No.: 481,396

[22] PCT Filed: Oct. 13, 1994

[86] PCT No.: PCT/JP94/01715

§ 371 Date: Jun. 13, 1995

§ 102(e) Date: Jun. 13, 1995

[87] PCT Pub. No.: WO95/10903

PCT Pub. Date: Apr. 20, 1995

[30] Foreign Application Priority Data

Oct. 14, 1993 [JP] Japan .................................. 5-257127
Jun. 23, 1994 [JP] Japan .................................. 6-142057

[51] Int. Cl.⁶ .................................................. H04J 13/00
[52] U.S. Cl. ........................ 370/342; 375/206; 375/208; 370/350
[58] Field of Search .................................. 370/18, 19, 20, 370/21, 110.1, 105.3, 105.4, 107, 108, 100.1; 375/206, 207, 208, 209, 210, 205, 362, 364, 367, 371, 373, 374, 375, 376, 359

[56] References Cited

U.S. PATENT DOCUMENTS

| 4,279,018 | 7/1981 | Carson | 375/208 |
|---|---|---|---|
| 5,003,552 | 3/1991 | Mower | 375/206 |
| 5,048,053 | 9/1991 | Mower et al. | 375/206 |
| 5,105,437 | 4/1992 | Kingston et al. | 375/206 |
| 5,128,957 | 7/1992 | Nakagawa | 375/208 |
| 5,504,787 | 4/1996 | Zscheile et al. | 375/208 |

OTHER PUBLICATIONS

Richard A. Yost & Robert W. Boyd, "A Modified PN Code Tracking Loop: Its Performance Analysis and Comparative Evaluation" IEEE, Transactions, vol. COM-30, No. 5, May 1982, Left col., p. 1027 to left col., p. 1028, Figs. 1(a), 2.

Masao Nakagawa "Basic and Application of Spread Spectrum Communication Technology", Torikeps K.K., Mar. 13, 1987, Lines 27 to 2, p. 77, Lines 1 to 6, p. 78, Figs. 10, 12.

Kazumasa Nitta and two others "Method of Constituting UW Reverse Modulation AFC and characteristics" 1993 IEICE Autumn General Conference Lecture Thesis, vol. 2 thesis No. B330, pp. 2 to 330, Sep. 5, 1993, Lines 12 to 25, (1) Premodulation UW Detection Circuit, Fig. 1.

Masao Nakagawa "Basic and Application of Spread Spectrum Communication Technology", Torikeps K.K., Mar. 13, 1987, Lines 1 to 17, p. 92, Fig. 28.

*Primary Examiner*—Wellington Chin
*Assistant Examiner*—Huy D. Vu
*Attorney, Agent, or Firm*—Rogers & Wells

[57] ABSTRACT

A correlation detector is provided which can establish initial acquisition quickly, and achieve high accuracy tracking by extracting crosscorrelation components in a receiver for CDMA communication, and a communication system using the correlation detector is also provided. During the initial acquisition, a received signal 21 is supplied to a matched filter 43. When an acquisition decision circuit 45 decides that the matched filter 43 detects the acquisition, it controls a switching circuit 42 to supply the received signal 21 to multipliers 47 and 48, and resets a VCCG 29 and a spreading code replica generator 30. After establishing the acquisition, a received spreading code is quasicoherent detected, and the detected spread signal is multiplied by a phase advanced replica and a phase retarded replica. Correlation detection signals are produced from the products, and squared components of the correlation detected signals are generated, summed in the opposite phase, and averaged along the time axis. The averaged signal is inversely modulated by a decision signal of received data to obtain a phase error signal, the decision signal being obtained by multiplying the received spread signal by a replica in synchronism with the received spread sinal, and by integrating the product over a plurality of chips to compensate for a receive phase error. The replica generator is driven by a clock signal whose phase is controlled by the phase error signal.

9 Claims, 8 Drawing Sheets

CORRELATION DETECTOR AND COMMUNICATION APPARATUS

TECHNICAL FIELD

The present invention relates to a correlation detector of a radio receiver in a CDMA (Code Division Multiple Access) system which carries out multiple access by using a spread spectrum in mobile communications.

In particular, the present invention relates to a CDMA synchronizing circuit that synchronizes a spreading code for despreading the received signal to a spreading code in a received signal in CDMA communications.

BACKGROUND ART

CDMA communications perform multiple access propagation by spreading information into wideband signals using spreading codes with rates higher than the rate of the information, and are roughly divided into direct sequence (DS) systems that spread modulated signals by high rate spreading codes, and frequency hopping (FH) systems. The FH system resolves each symbol into smaller elements called chips, and translates the chips into signals with different center frequency at a high speed. Since the implementation of the FH system is difficult, the DS system is generally used. The DS system recovers the original narrowband signal by despreading the wideband received input signal at a receiving end, followed by demodulation. In the despreading process, correlation detection is performed between the spreading code included in the received signal and a spreading code generated at the receiving end.

Figure 1:
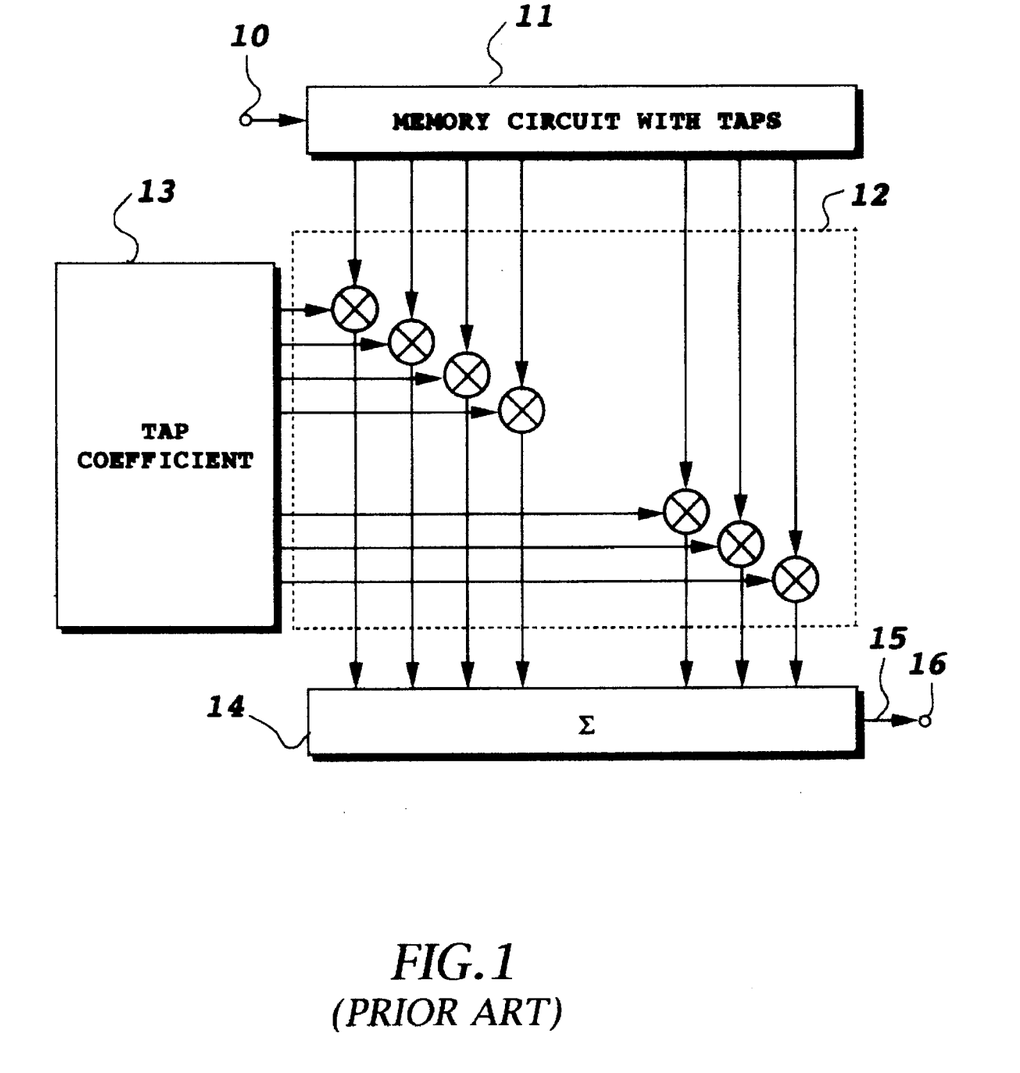
FIG. 1 is a block diagram showing a synchronizing circuit or an initial acquisition circuit of a conventional matched filter.

Thus, the receiver for receiving the spread signal in the DS system is usually provided with a replica (reference PN sequence) of the PN sequence (received PN sequence) in the received signal, and establishes synchronization between the reference PN sequence and the received PN sequence. FIG. 1 shows a conventional synchronization circuit using a matched filter. The received signal applied to an input terminal 10 is supplied to a memory circuit 11 with taps. The number of taps of the tapped memory circuit 11 is the same as the number of chips in a spreading code interval (that is, a processing gain PG). The outputs of the taps of the memory circuit 11 are multiplied by the reference spreading code stored in a tap coefficient circuit 13 by multipliers 12. The resultant products are summed by an integrator 14, which outputs the sum from its output terminal 16 as a correlation value 15.

Using the matched filter makes it possible to quickly establish the synchronization because the peaks of the correlation value appear at the same interval as that of the spreading code. However, since the capacity of the tapped memory circuit 11 and the number of the multipliers 12 increase in proportion to the processing gain, the power consumption of the receiver will increase with the interval of the spreading code. Therefore, the conventional synchronizing circuit is not appropriate for portable devices or mobile devices.

Figure 2:
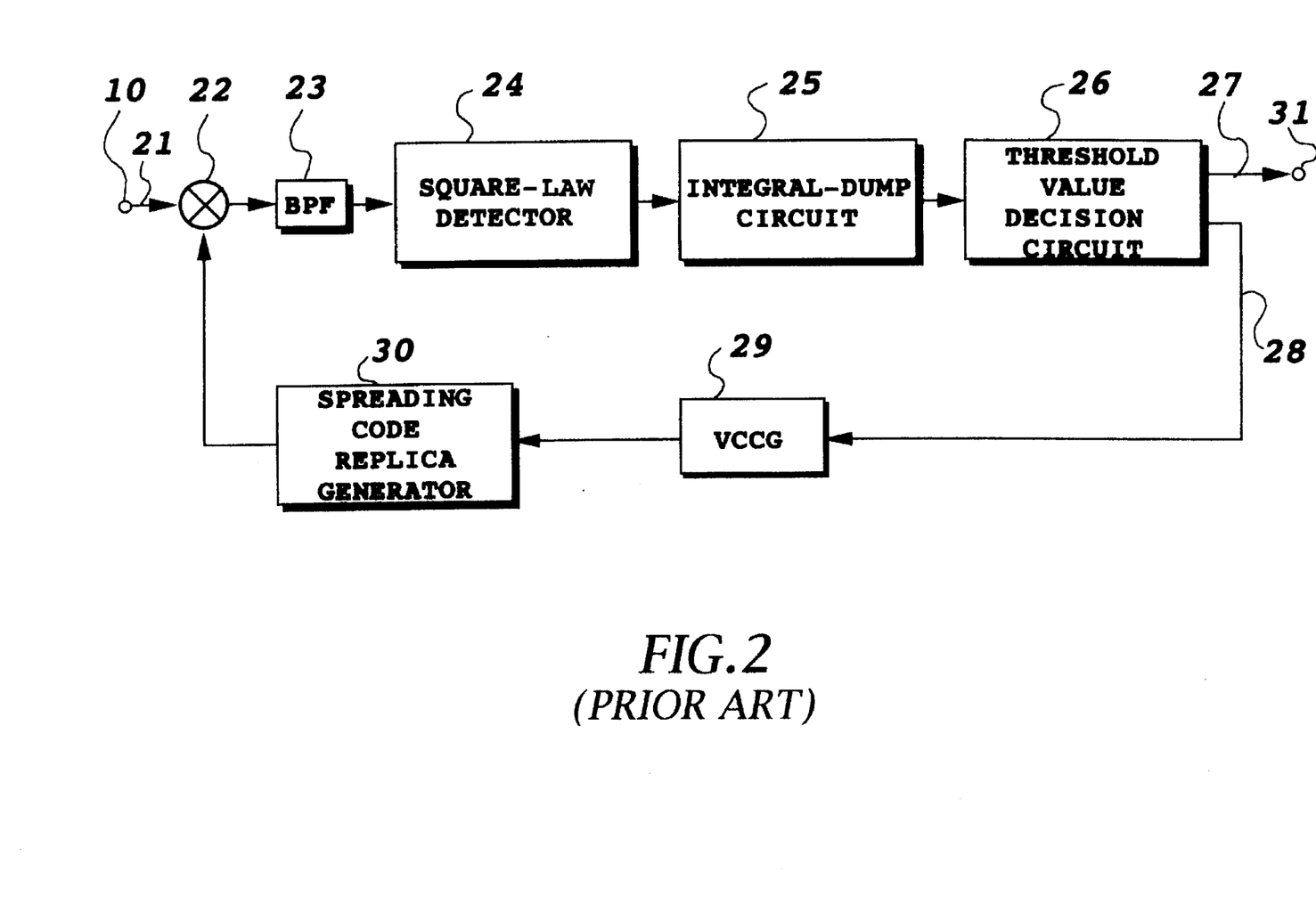
FIG. 2 is a block diagram showing a conventional sliding correlator.

Using a sliding correlation detector as shown in FIG. 2 makes possible power saving and downsizing of the circuit. In FIG. 2, a received signal 21 inputted to the input terminal 10 is multiplied by a spreading code, which is generated by a spreading code replica generator 30, by a multiplier 22 to obtain the correlation between the two. The resultant product is passed through a bandpass filter (BPF) 23, followed by peak power detection by a square-law detector 24. The detected power is integrated over a fixed time (normally, ± one chip interval) by an integral-dump circuit 25. The integrated result is compared with a threshold value by a threshold value decision circuit 26 which decides that initial acquisition has been completed if the integrated result exceeds the threshold value, and proceeds to the next step (tracking mode). If the integrated result is less than the threshold value, the decision circuit 26 supplies a control voltage 28 to a voltage controlled clock generator (VCCG) 29 which slides the phase of the replica so that the phase of the spreading code generated by the spreading code replica generator 30 is shifted by 1/N chip interval (N is a natural number equal to or greater than one). The initial acquisition has been completed by repeating the processing until the synchronized point is found.

According to this method, it is necessary to integrate the spreading replica over the fixed time every time the replica is shifted by 1/N chip interval, and to detect the synchronized point in the interval of the spreading code by comparing the integrated result. This will lengthen the acquisition time, and hence, it is not appropriate for a system which requires a quick acquisition.

In addition, the conventional correlation detector presents another problem in that it provides a rather large error in maintaining (tracking) the synchronization.

Figure 3:
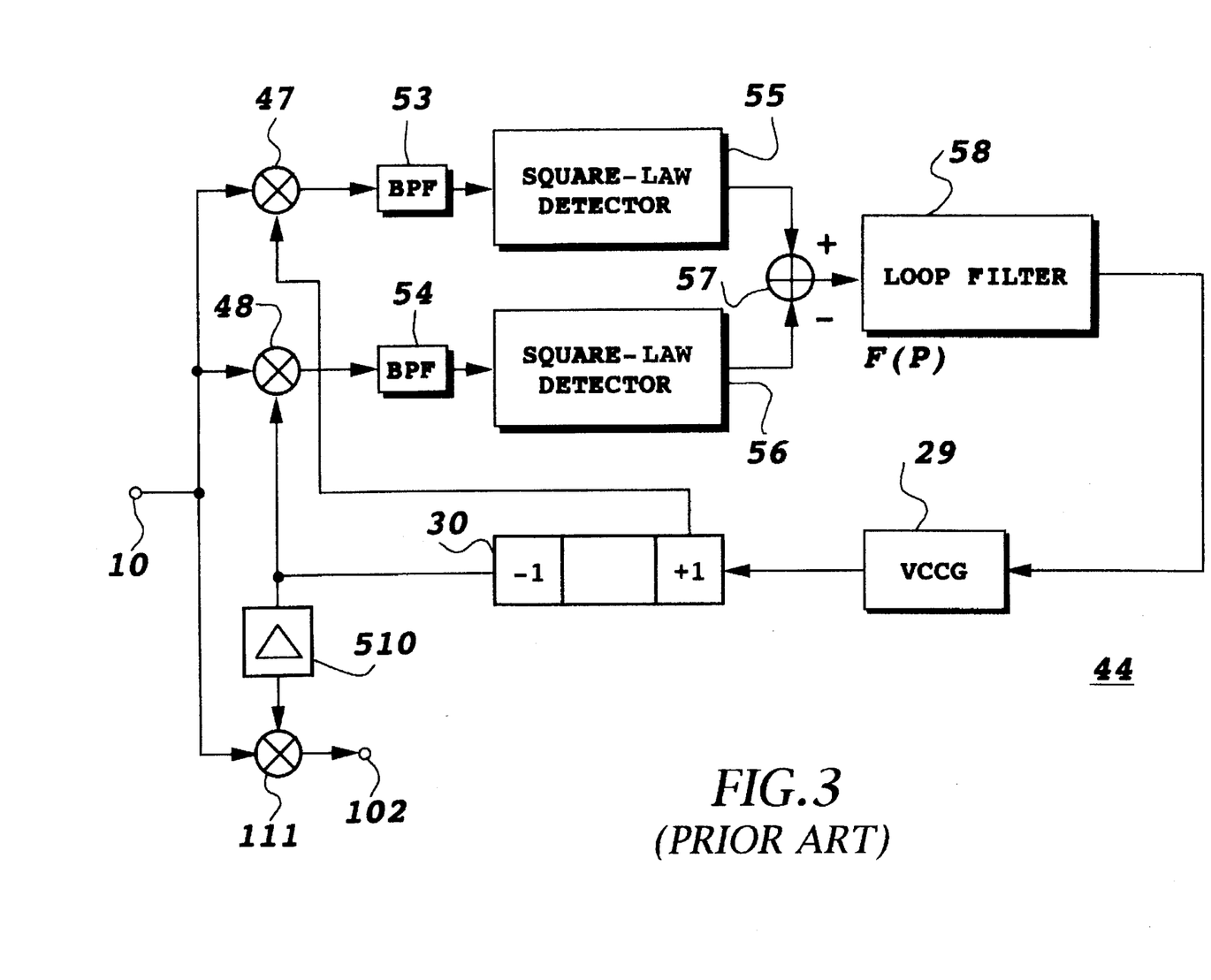
FIG. 3 is a block diagram showing a conventional DLL.

FIG. 3 is a block diagram showing a conventional DLL (Delay Locked Loop) correlation detector 44. In FIG. 3, the same functional blocks are designated by the same numerals as in FIG. 2. The reference numeral 10 designates a spreaded signal input terminal, 102 designates a decided data output terminal, 111 denotes a multiplier, and 510 designates a delay circuit. The correlation detector 44 calculates correlations between the input modulated signal and code sequences formed by advancing and retarding the chip phase of the replica by 1/N, respectively. The correlated signals are passed through bandpass filters (BPFs) 53 and 54 which eliminate unnecessary high frequency components, and are detected by square-law detectors 55 and 56. The squared amplitude components are summed by an adder 57 in the opposite phase, so that an error signal voltage is obtained which indicates an amount of a phase difference. The error signal voltage is passed through a loop filter 58, and is fed back to a VCCG 29 to correct the phase of the replica code sequence. The phase advance (or retardation) time δ ranges from 0 to Tc, where Tc is the chip interval.

Applying the CDMA system to cellular communications requires high accuracy transmission power control that keeps constant base station's received levels of signals sent from all the mobile stations. The CDMA system can increase the capacity in terms of the number of subscribers per frequency band as compared with the FDMA system or the TDMA system. This is because conventional systems which employ frequency orthogonality cannot utilize the same carrier frequencies in the contiguous cells, and even space diversity systems cannot reuse the same frequencies within four cells.

In contrast with this, the CDMA system makes it possible to reuse the same carrier frequency in the contiguous cells because the signals of the other communicators are regarded as white noise. Accordingly, the CDMA system can increase the capacity in terms of the number of subscribers as compared with the FDMA system or the TDMA system. If the processing gain is pg, the number of spreading code sequences that completely orthogonalize with each other is pg. This number of the code sequences, however, will be insufficient when information data is spread by using only code sequences of one symbol interval long. To overcome this problem, the number of the spreading codes is increased almost infinitely by superimposing long code sequences of a very long interval over short code sequences of one symbol interval.

Unlike M sequences that have definite autocorrelation characteristics, the autocorrelation of Gold sequences and that of the sequences obtained by superimposing very long code sequences over the Gold sequences will have undesired peaks of considerable amplitudes in addition to the normal correlation peak in one symbol interval. As a result, when the received signal level is low, a lock may be lost in the conventional delay-locked loop using one chip interval lock. Let us formulate the operation principle of the delay-locked loop of FIG. 3. First, the input signal is expressed by the following equation.

$$s(t) = \sqrt{2S} \; c(t-\tau_t)m(t-\tau_t)\cos[\Delta w_0 t + \Delta\theta(t)] \quad (1)$$

where S is average signal power, $c(t-\tau_t)$ is a received spreading code including a propagation delay, $m(t-\tau_t)$ represents data modulation including the propagation delay, $\omega_0$ is the angular frequency of a carrier, and $\Omega(t)=\Omega_0+\Theta_0 t$ is an unknown carrier phase which is represented as the sum of a constant term and a term proportional to the Doppler frequency. The power spectrum density of n(t) is $N_{0/2}$. $\delta\omega_0$ is an angular frequency error between the center frequency of a modulation signal and a local oscillation frequency. In addition, the bandpassed expression of input thermal noise $n_i(t)$ is given by $$n_i(t) = \quad (2)$$

$$\sqrt{2} \; \{N_c(t) \cdot \cos[\Delta\omega_0 t + \Delta\theta(t)] - N_s(t) \cdot \sin[\Delta\omega_0 t + \Delta\theta(t)]\}$$

where $N_c(t)$ and $N_s(t)$ are assumed to be approximately and statistically independent and steady. The spreading replica sequence of the advanced phase and that of the retarded phase can be expressed as follows:

$$C(t-\hat{\tau}_t+\delta), C(t-\hat{\tau}_t-\delta) \quad (2A)$$

where $\hat{\tau}_t$ is a propagation delay estimated by the DLL at the receiving side. The crosscorrelation output of the phase detector is expressed as $$\epsilon_\pm(t) = \sqrt{2S} \; K_m m(t-\tau_t)\overline{c(t-\tau_t)c(t-\hat{\tau}_t \pm \delta)} \times \quad (3)$$

$$\cos[\Delta\omega_0 t + \Delta\theta(t)] + \sqrt{2S} \; K_m m(t-\tau_t) \times$$

$$[c(t-\tau_t)c(t-\hat{\tau}_t \pm \delta) - \overline{c(t-\tau_t)c(t-\hat{\tau}_t \pm \delta)}] \times$$

$$\cos[\Delta\omega_0 t + \Delta\theta(t)] + K_m c(t-\hat{\tau}_t \pm \delta)n_i(t)$$

where $K_m$ is the gain of the phase detector which is assumed to be equal in both branches, and $\overline{X}$ represents the average of a set.

Figure 4A:
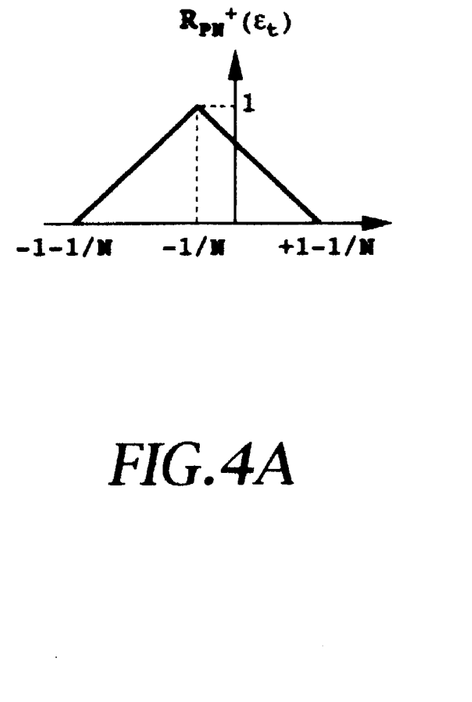
FIGS. 4A–4C are diagrams illustrating crosscorrelation output signals in terms of a phase error of received signal.
Figure 4B:
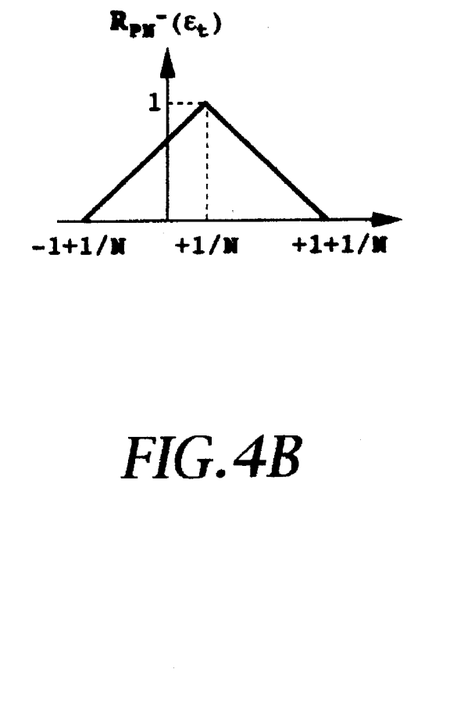
Figure 4C:
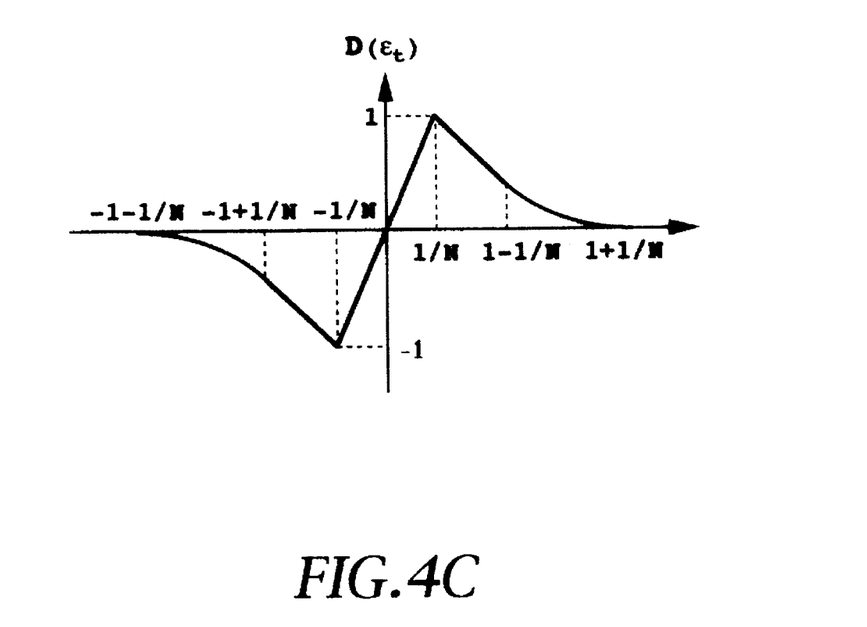

FIGS. 4A–4B illustrate the autocorrelation outputs in terms of the received chip phase error. Here, $$\epsilon_t \equiv (\tau_t - \hat{\tau}_t)/Tc \quad (3A)$$

is a normalized propagation delay error. H(s) is a lowpass expression of a transfer function H(s) of the bandpass filter, and $$\epsilon_\pm(t-\hat{\tau}_t,\epsilon_t) \equiv c(t-\tau_t)c(t-\hat{\tau}\pm\delta) - \overline{c(t-\tau_t)c(t-\hat{\tau}_t\pm\delta)} \quad (4)$$

is a process of a PN sequence.

The output of the square-law detector can be expressed as follows using $R_{pN\pm}(x)$ which is a function obtained by shifting the autocorrelation function of PN by a time period of +x.

$$y_\pm(t) = \sqrt{2S} \; K_m \hat{m}(t-\tau_t)R_{PN\pm}(\epsilon_t)\cos[\Delta\omega_0 t + \Delta\theta(t)] + \quad (5)$$

$$\sqrt{2S} \; K_m \hat{\epsilon}_\pm(t-\tau_t, \epsilon_t)\cos[\Delta\omega_0 t + \Delta\theta(t)] +$$

$$\sqrt{2} \; \hat{N}_{c\pm}(t)\cos[\Delta\omega_0 t + \Delta\theta(t)] - \sqrt{2} \; \hat{N}_{s\pm}(t)\sin[\Delta\omega_0 t + \Delta\theta(t)]$$

where $$\hat{m}(t) = H_1(P)m(t)$$

$$\hat{\epsilon}_{c\pm}(t,\epsilon_t) = H_1(P)[m(t)\epsilon_{c\pm}(t,\epsilon_t)]$$

$$\hat{N}_{c\pm}(t) = H_1(P)[m(t)c(t-\tau_t\pm\epsilon_t)N_c(t)]$$

$$\hat{N}_{s\pm}(t) = H_1(P)[m(t)c(t-\tau_t\pm\epsilon_t)N_s(t)] \quad (6)$$

Here, $H/(p) \times (t)$ expresses an output response of the BPF to x(t). If the bandwidth $B_L$ is sufficiently smaller than the chip rate, the effect of the auto-noise caused by the PN sequence on the loop is negligible in the first-order approximation. Neglecting the auto-noise and the secondary harmonic caused by the square-law detection, the input to the loop filter can be expressed by the following equation.

$$e(t) \equiv y_-^2(t) - y_+^2(t) = SK_m^2\hat{m}^2(t-\tau_t)D(\epsilon_t) + K_m^2 n_e(t,\epsilon_t) \quad (7)$$

where $$D(\epsilon_t) = R^2_{PN-}(\epsilon_t) - R^2_{PN+}(\epsilon_t) \quad (7A)$$

According to the foregoing, a normalized delay estimate of the output of the spreading code replica generator is expressed by the following equation using e(t).

$$\frac{\hat{\tau}_t}{T_c} = \frac{K_{VCC}F(P)}{P} \; e(t) \quad (8)$$

where F(s) is the transfer function of the loop filter, and $K_{VCC}$ is the gain of a voltage controller in the VCCG which drives the PN sequence generator. Placing $K=K_m^2 K_{VCC}$, K represents the loop gain. Substituting equation (7) into (8), $$\frac{\hat{\tau}_t}{T_c} = \frac{KF(P)}{P} \; [S\hat{m}^2(t-\tau_t)D(\epsilon_t) + n_e(t,\epsilon_t)] \quad (9)$$

Thus, estimated error $\epsilon_t$ is expressed as $$\epsilon_t = \frac{\tau_t}{T_c} - \frac{KF(P)}{P} \; [S\hat{m}^2(t-\tau_t)D(\epsilon_t) + n_e(t,\epsilon_t)] \quad (10)$$

Resolving the first term in the blanket of the above equation into an average value term and modulated auto-noise term gives $$\hat{m}^2(t-\tau_t)D(\epsilon_t) = \quad (11)$$

$$<\overline{\hat{m}^2(t-\tau_t)}>D(\epsilon_t) + [\hat{m}^2(t-\tau_t) - <\overline{\hat{m}^2(t-\tau_t)}>]D(\epsilon_t)$$

where < > expresses an average in time, and $$\overline{< \dot{m}^2(t - \tau_t) >} \equiv M_2 = \int_{-\infty}^{\infty} S_m(f) H_1(j2\pi f)^2 df \quad (12)$$

where Sm(f) is a power spectrum density of the data modulation. The $M_2$ term is the integral of the data modulation power spectrum density over the passband of the filter, and indicates the data modulation power in the passband. Since the bandwidth of the loop is much smaller than the data symbol rate, the auto-noise associated with the second term of equation (11) is negligible.

From equation (10), the following equation is obtained.

$$\dot{\epsilon} = \frac{\dot{\tau}_t}{T_c} - KF(P)\eta SM_2 \left[ D(\epsilon_t) + \frac{n_e(t, \epsilon_t)}{\eta SM_2} \right] \quad (13)$$

where a dot placed over characters represents a time differential, and $\eta$ is given by $$\eta \equiv \frac{4(N-1)}{N} \quad (13A)$$

Briefly, the average of squared tracking jitter due to noise component is expressed as follows:

$$\sigma_\epsilon^2 = \overline{\epsilon_t^2} = \frac{\overline{N_e(\epsilon_t)} B_L}{(\eta SM_2)^2} \quad (14)$$

where $B_L$ is an equivalent noise bandwidth of the LPF, and $N_e(\epsilon_t)$ is expressed as $$N_e(\epsilon_t) = \quad (15)$$

$$4N_o^2 \int_{-\infty}^{\infty} |H_e(j2\pi f)|^4 df + 4SN_o f(\epsilon_t) \int_{-\infty}^{\infty} S_m(f) |H_e(j2\pi f)|^4 df$$

where $f(\epsilon_t)$ represents a square-law detection curve.

Since the conventional DLL uses the square-law detector as shown in equation (15), the noise component is also squared. This will increase the tracking jitter as shown in equation (14).

DISCLOSURE OF THE INVENTION

Therefore, an object of the present invention is to provide a low power-consumption CDMA synchronizing circuit capable of high speed synchronization. Another object of the present invention is to provide a correlation detector that can perform high accuracy tracking capable of eliminating the square loss resulting from the emphasis of the noise component by the square-law detector, which differs from the conventional code tracking circuit.

In a first aspect of the present invention, there is provided a synchronizing apparatus including a tracking means for maintaining synchronization between a received signal and a despreading code by using a correlation between the received signal and the despreading code, the received signal being CDMA spread and received by a receiver, and the despreading code being used for despreading the received signal, the tracking means comprising:

replica generating means for generating a phase advanced replica of a CDMA spreading code with an advance phase with respect to the received signal, and a phase retarded replica of the CDMA spreading code with a retarded phase with respect to the received signal;

first multiplication means for multiplying the received signal by the phase advanced replica;

second multiplication means for multiplying the received signal by the phase retarded replica;

a first filter for extracting from an output signal of the first multiplication means a first correlation detection signal indicating a correlation between the phase advanced replica and the received signal; and a second filter for extracting from an output signal of the second multiplication means a second correlation detection signal indicating a correlation between the phase retarded replica and the received signal.

The tracking means may further comprise compensation means for compensating for the correlation detection signals on the basis of a despreading code generated by despreading the received signal.

The replica generating means may further comprise means for generating a replica of the CDMA spreading code whose phase is in synchronism with the received signal; and the tracking means comprises:

carrier frequency error compensation means for compensating for a carrier frequency error associated with the first and second correlation detection signals;

addition means for summing in opposite phase the first and second correlation detection signals, which have been compensated by the carrier frequency error compensation means;

averaging means for averaging an output signal of the addition means along a time axis;

multiplication means for multiplying the received signal by the replica in synchronism with the received signal;

integral means for integrating an output signal of the multiplication means over M chip intervals;

automatic frequency control means for detecting the carrier frequency error from an output signal of the integral means, and for compensating for the carrier frequency error;

decision means for outputting a decided signal of received data by performing received phase error compensation on the output signal of the integral means;

inverse modulation means for inversely modulating an output signal of the averaging means by the decided signal; and clock generating means for outputting a clock signal whose phase is controlled by a phase error signal outputted from the inverse modulation means, wherein the replica generating means generates the replica in accordance with the clock signal generated by the clock generating means.

The synchronizing apparatus may further comprise:

initial acquisition means including tapped storing means for storing the received signal of at least one spreading code interval long, tap coefficient means for storing the despreading code, fourth multiplication means for multiplying individual chips stored in the tapped storing means by stored patterns of the despreading code stored in the tap coefficient means, and second addition means for summing outputs of the fourth multiplication means; and switching means for supplying the received signal to the initial acquisition means when a phase difference between the received signal and the despreading code is greater than a predetermined value, and for supplying the received signal to the tracking means when the phase difference is smaller than the predetermined value.

In a second aspect of the present invention, there is provided a CDMA communication apparatus including a tracking means for maintaining synchronization between a received signal and a despreading code by using a correlation between the received signal and the despreading code, the received signal being CDMA spread and received by a receiver, and the despreading code being used for despreading the received signal, the tracking means comprising:

replica generating means for generating a phase advanced replica of a CDMA spreading code with an advance phase with respect to the received signal, and a phase retarded replica of the CDMA spreading code with a retarded phase with respect to the received signal;

first multiplication means for multiplying the received signal by the phase advanced replica;

second multiplication means for multiplying the received signal by the phase retarded replica;

a first filter for extracting from an output signal of the first multiplication means a correlation detection signal indicating a correlation between the phase advanced replica and the received signal; and     a second filter for extracting from an output signal of the second multiplication means a correlation detection signal indicating a correlation between the phase retarded replica and the received signal.

The tracking means may further comprise compensation means for compensating for the correlation detection signals on the basis of a despreading code generated by despreading the received signal.

The replica generating means may further comprise means for generating a replica of a CDMA spreading code, whose phase is in synchronism with the received signal; and the tracking means comprises:

third multiplication means for multiplying the received signal by the replica in synchronism with the received signal;

integral means for integrating an output signal of the third multiplication means over M chip intervals;

automatic frequency control means for detecting a carrier frequency error from an output signal of the integral means, and for compensating for the carrier frequency error;

carrier frequency error compensation means for compensating for the carrier frequency error associated with outputs of the first and second correlation detection signals;

addition means for summing in opposite phase the output of the first filter and the output of the second filter, which have been compensated by the carrier frequency error compensation means;

averaging means for averaging an output signal of the addition means along a time axis;

decision means for outputting a decided signal of received data by performing received phase error compensation on the output signal of the integral means;

inverse modulation means for inversely modulating an output signal of the averaging means by the decided signal; and     clock generating means for outputting a clock signal whose phase is controlled by a phase error signal outputted from the inverse modulation means,     wherein the replica generating means is driven by the clock signal generated by the clock generating means.

The CDMA communication apparatus may further comprise:

initial acquisition means including tapped storing means for storing the received signal of at least one spreading code interval long, tap coefficient means for storing the despreading code, fourth multiplication means for multiplying individual chips stored in the tapped storing means by stored patterns of the despreading code stored in the tap coefficient means, and second addition means for summing outputs of the fourth multiplication means; and     switching means for supplying the received signal to the initial acquisition means when a phase difference between the received signal and the despreading code is greater than a predetermined value, and for supplying the received signal to the tracking means when the phase difference is smaller than the predetermined value.

In a third aspect of the present invention, there is provided a synchronizing method including a tracking step of maintaining synchronization between a received signal and a despreading code by using a correlation between the received signal and the despreading code, the received signal being CDMA spread and received by a receiver, and the despreading code being used for despreading the received signal, the tracking step comprising the steps of:

generating a phase advanced replica of a CDMA spreading code with an advance phase with respect to the received signal, and a phase retarded replica of the CDMA spreading code with a retarded phase with respect to the received signal;

multiplying the received signal by the phase advanced replica;

multiplying the received signal by the phase retarded replica; and     extracting, from products of the multiplications, correlation detection signals indicating correlations between the replicas and the received signal.

The tracking step may further comprise a step of compensating for the correlation detection signals on the basis of a despreading code generated by despreading the received signal.

The synchronizing method may further comprise a step of generating a replica of the CDMA spreading code whose phase is in synchronism with the received signal, and wherein the tracking step comprises:

compensating for a carrier frequency error associated with the two correlation detection signals;

addition means for summing in opposite phase the two correlation detection signals whose carrier frequency error is compensated;

averaging a summed result along a time axis;

multiplying the received signal by the replica in synchronism with the received signal;

integrating the product over M chip intervals;

detecting the carrier frequency error from the integrated signal, and for compensating for the carrier frequency error;

outputting a decided signal of received data by performing received phase error compensation on the integrated signal;

inversely modulating the averaged summed result by the decided signal, thereby generating a phase error signal; and     generating a clock signal whose phase is controlled by the phase error signal,     wherein the replica is generated in accordance with the clock signal.

The synchronizing method may further comprise:

an initial acquisition step of storing the despread code, storing the received signal of at least one spreading code interval long, multiplying individual chips of the received signal by individual patterns of the despreading code, and summing the products; and switching step of performing initial acquisition of the received signal in the initial acquisition step when a phase difference between the received signal and the despreading code is greater than a predetermined value, and of tracking the received signal in the tracking step when the phase difference is smaller than the predetermined value.

In a fourth aspect of the present invention, there is provided a CDMA communication system including receivers, each of the receivers being provided with a tracking means for maintaining synchronization between a received signal and a despreading code by using a correlation between the received signal and the despreading code, the received signal being CDMA spread and received by the receiver, and the despreading code being used for despreading the received signal, the tracking means comprising:

replica generating means for generating a phase advanced replica of a CDMA spreading code with an advance phase with respect to the received signal, and a phase retarded replica of the CDMA spreading code with a retarded phase with respect to the received signal;

first multiplication means for multiplying the received signal by the phase advanced replica;

second multiplication means for multiplying the received signal by the phase retarded replica;

a first filter for extracting from an output signal of the first multiplication means a correlation detection signal indicating a correlation between the phase advanced replica and the received signal; and a second filter for extracting from an output signal of the second multiplication means a correlation detection signal indicating a correlation between the phase retarded replica and the received signal.

The tracking means may further comprise compensation means for compensating for the correlation detection signals on the basis of a despreading code generated by despreading the received signal.

The replica generating means may further comprise means for generating a replica of a CDMA spreading code, whose phase is in synchronism with the received signal; and the tracking means comprises:

third multiplication means for multiplying the received signal by the replica in synchronism with the received signal;

integral means for integrating an output signal of the third multiplication means over M chip intervals;

automatic frequency control means for detecting a carrier frequency error from an output signal of the integral means, and for compensating for the carrier frequency error;

carrier frequency error compensation means for compensating for the carrier frequency error associated with outputs of the first and second correlation detection signals;

addition means for summing in opposite phase the output of the first filter and the output of the second filter, which have been compensated by the carrier frequency error compensation means;

averaging means for averaging an output signal of the addition means along a time axis;

decision means for outputting a decided signal of received data by performing received phase error compensation on the output signal of the integral means;

inverse modulation means for inversely modulating an output signal of the averaging means by the decided signal; and clock generating means for outputting a clock signal whose phase is controlled by a phase error signal outputted from the inverse modulation means, wherein the replica generating means is driven by the clock signal generated by the clock generating means.

The CDMA communication system may further comprise:

initial acquisition means including tapped storing means for storing the received signal of at least one spreading code interval long, tap coefficient means for storing the despreading code, fourth multiplication means for multiplying individual chips stored in the tapped storing means by stored patterns of the despreading code stored in the tap coefficient means, and second addition means for summing outputs of the fourth multiplication means; and switching means for supplying the received signal to the initial acquisition means when a phase difference between the received signal and the despreading code is greater than a predetermined value, and for supplying the received signal to the tracking means when the phase difference is smaller than the predetermined value.

The synchronizing circuit in accordance with the present invention has the initial acquisition circuit for performing correlation detection using a matched filter, the sliding correlation detector for performing correlation detection, and a switching circuit for selectively supplying the received signal to the initial acquisition circuit and the correlation detector. The switching circuit supplies the received signal to the initial acquisition circuit during the initial acquisition phase, whereas to the correlation detector once the initial acquisition has been established.

Furthermore, in the correlation detector in accordance with the present invention, which holds the synchronism between the received signal and the replica by using the correlation signal indicating the phase difference between the spread signal received by the receiver and the replica of the CDMA spreading code generated by the receiver, the correlation signal is compensated for by the tracking means on the basis of the despread signal. This makes it possible for the correlation detector to achieve accurate tracking.

BEST MODE FOR CARRYING OUT THE INVENTION

The best mode for carrying out the invention will now be described with reference to the accompanying drawings.

EMBODIMENT 1

Figure 5:
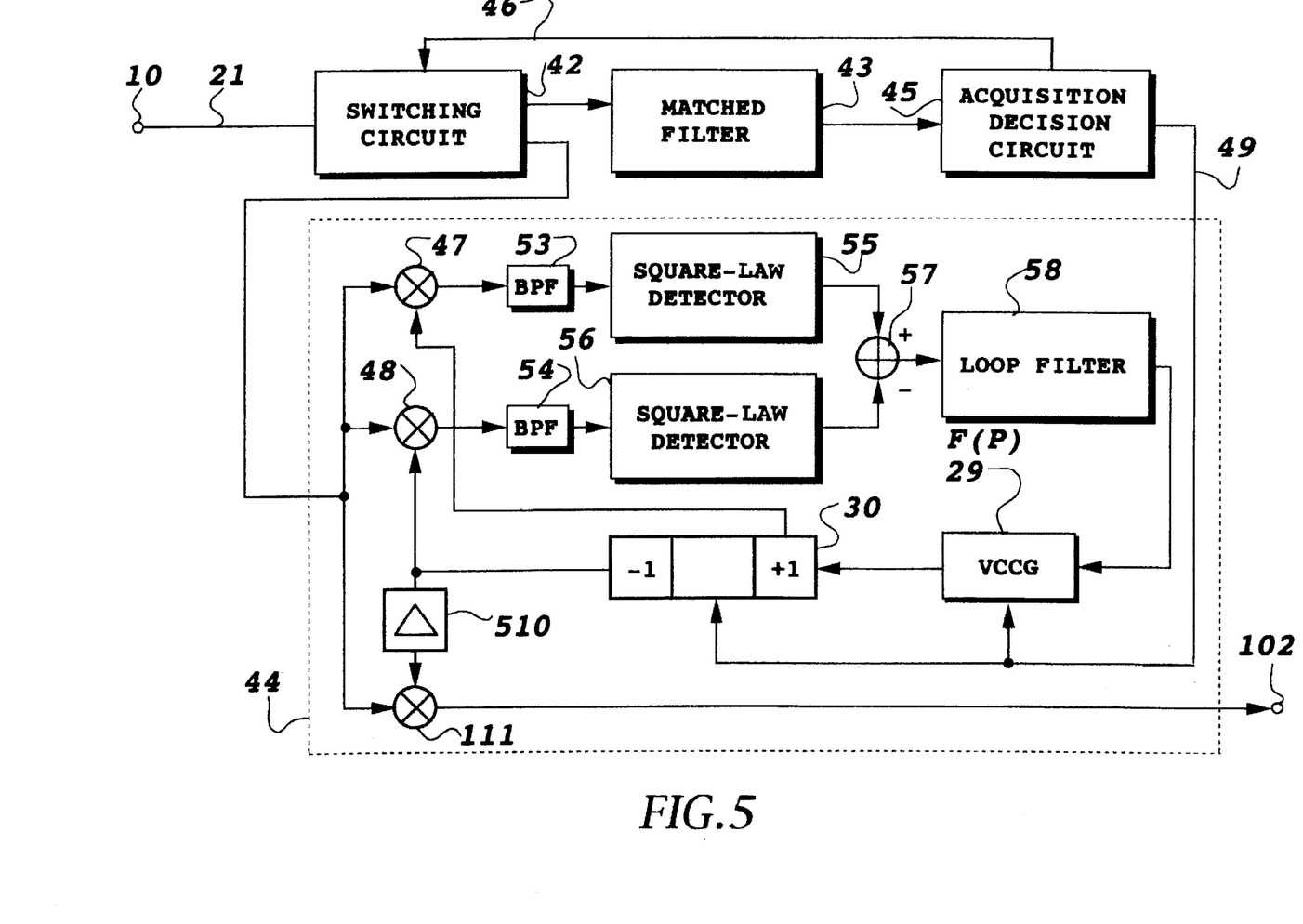
FIG. 5 is a block diagram showing a basic arrangement of a first embodiment of a correlation detector in accordance with the present invention.

FIG. 5 shows an embodiment of the present invention. A received signal 21 applied to the input terminal 10 is selectively supplied through a switching circuit 42 to an initial acquisition circuit 43 consisting of a matched filter or to a correlation detector 44. The initial acquisition circuit 43 has an arrangement similar to that of FIG. 1. The correlation detector 44 has a function similar to the correlation detectors of FIGS. 2 and 3. When the initial acquisition has not yet been completed, the received signal is supplied to the initial acquisition circuit (matched filter) 43 in accordance with a switching signal 46 from an acquisition decision circuit 45, so that the correlation detection is performed. The correlation value detected by the matched filter 43 is compared with a threshold value in the acquisition decision circuit 45. If the correlation value is greater than or equal to the threshold value, the acquisition decision circuit 45 decides that the initial acquisition has been completed, and changes the switching circuit 42 using the switching signal 46. Thus, the received signal is inputted to multipliers 47 and 48 in the correlation detector 44. The acquisition decision circuit 45 provides an initial reset signal 49 to a VCCG 29 and a spreading code replica generator 30.

The received signal 21 after the initial acquisition is multiplied by spreading codes 51 and 52 by the multipliers 47 and 48, the spreading codes being generated by the spreading code replica generator 30, and having phases shifted forward and backward in time by an amount T (less than one chip interval). The two products are passed through bandpass filters (BPF) 53 and 54, and are square-law detected by square-law detectors 55 and 56, in which correlation values are detected. The correlation values are summed in the opposite phase by an adder 57. The sum is passed through a loop filter 58, and becomes a control voltage of the VCCG 29. The clock signal generated by the VCCG 29 regulates the phase of the spreading code replica generator 30, tracks the synchronous point, and maintains the synchronization.

Figure 6:
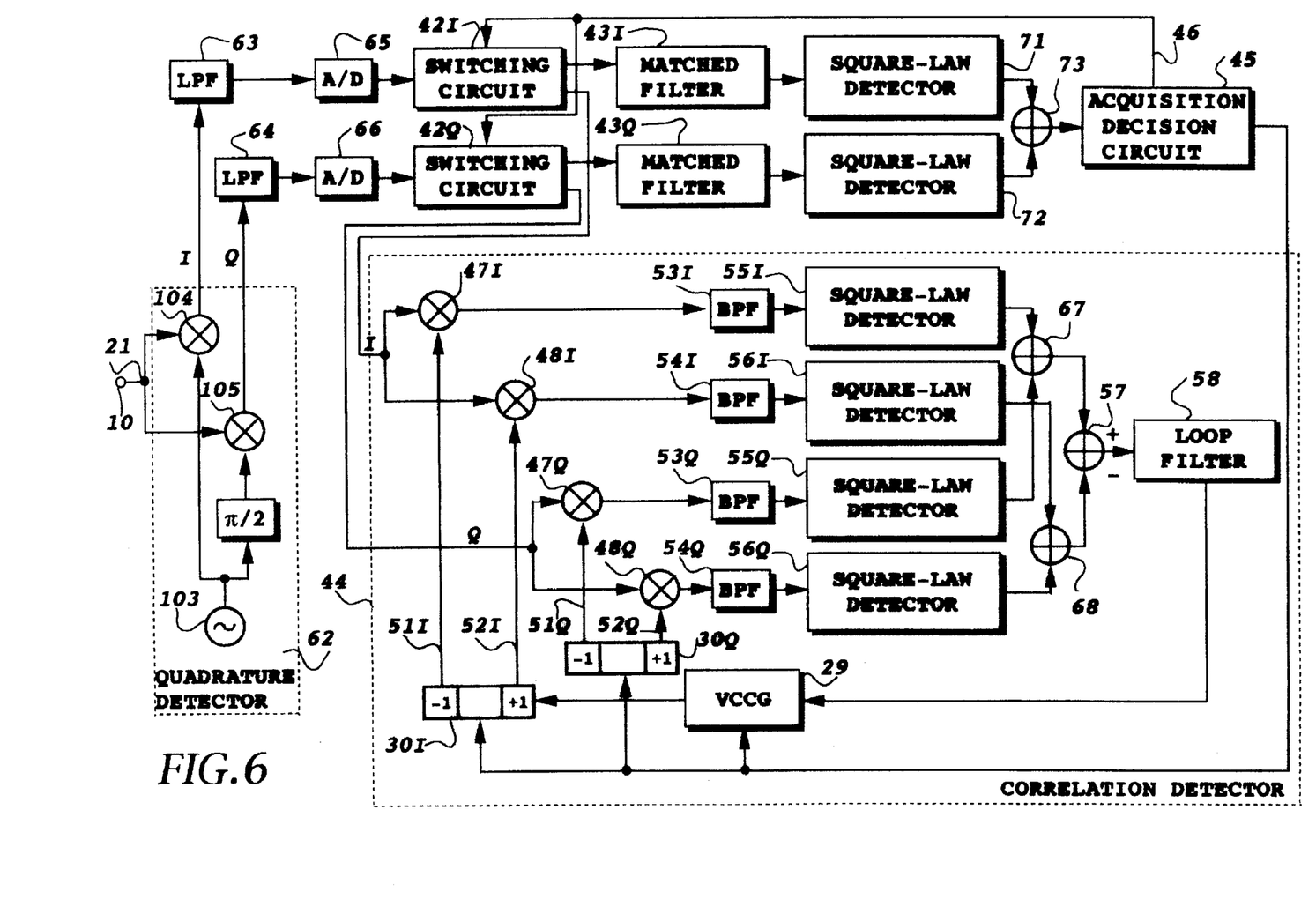
FIG. 6 is a block diagram showing another basic arrangement of the first embodiment of a correlation detector in accordance with the present invention.

FIG. 6 illustrates an example, in which the spreading code replica generator 30I is synchronized with the outputs of the quadrature detector 62 which detects the received signal 21 applied to the input terminal 10. In this figure, portions corresponding to those of FIG. 5 are designated by the same reference numerals. Suffixes I and Q are attached to the same numerals as in FIG. 5 to represent processing circuits of the two detected outputs I and Q of the quadrature detector 62. The detected outputs I and Q are passed through lowpass filters 63 and 64, converted into digital signals by A/D converters 65 and 66, and supplied to switching circuits 42I and 42Q. The outputs of the initial acquisition circuits 43I and 43Q are square-law detected by square-law detectors 71 and 72, summed by an adder 73, and supplied to the acquisition decision circuit 45 which decides whether the initial acquisition is established or not.

A spreading code replica generator 30I in the correlation detector 44 generates an advanced spreading code 51I with an advanced phase and a retarded spreading code 52I with a retarded phase. Likewise, a spreading code replica generator 30Q generates an advanced spreading code 51Q with the advanced phase and a retarded spreading code 52Q with the retarded phase. The detected output component I outputted from the switching circuit 42I is multiplied by the advanced spreading code 51I and the retarded spreading code 52I by multipliers 47I and 48I. Likewise, the detected output component Q outputted from the switching circuit 42Q is multiplied by the advanced spreading code 51Q and the retarded spreading code 52Q by multipliers 47Q and 48Q.

The detected correlation values with the advanced spreading codes 51I and 51Q, which are outputted from the multipliers 47I and 47Q, are passed through bandpass filters (BPFs) 53I and 53Q, square-law detected by square-law detectors 55I and 55Q, and are summed by an adder 67. Similarly, the detected correlation values with the retarded spreading codes 52I and 52Q, which are outputted from the multipliers 48I and 48Q, are passed through bandpass filters (BPFs) 54I and 54Q, square-law detected by square-law detectors 56I and 56Q, and are summed by an adder 68. The outputs of the adders 67 and 68 are summed in the opposite phase by the adder 57. These operations are similar to those of FIG. 5.

According to the first embodiment, the synchronization process is separated into an initial acquisition process, and a tracking process using the correlation detector. The input PN sequence is acquired so that the phase difference between the input PN sequence and the reference PN sequence is settled within a range sufficiently smaller than ± one chip interval during the initial acquisition because the autocorrelation of the PN sequence is established only within a range of ± one chip. The tracking processing holds the phase difference between the input PN sequence and the reference PN sequence within the range.

EMBODIMENT 2

Figure 7:
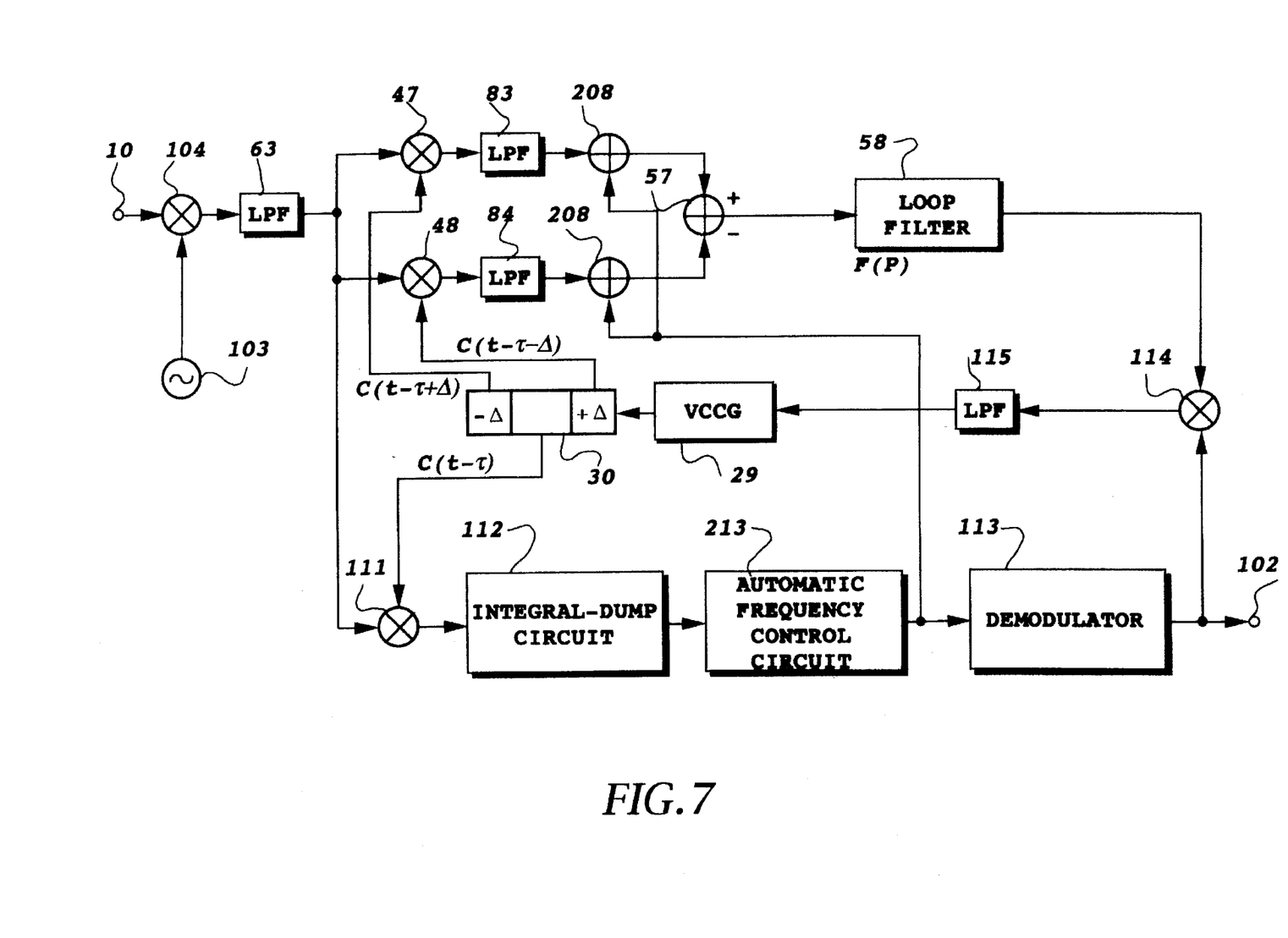
FIG. 7 is a block diagram showing details of hardware of the correlation detector in accordance with the present invention.

FIG. 7 is a block diagram of a correlation detector of a second embodiment. In FIG. 7, the same functional blocks are designated by the same reference numerals as in FIGS. 1–6. As shown in FIG. 7, a signal applied to the input terminal 10 is quasi-coherent detected by a detector 104 using a local signal generated by a local oscillator 103. The local signal has a fixed frequency substantially equal to the center frequency of the modulated signal. The correlation detector includes multipliers 47 and 48 for detecting correlations between the received spreading code and replicas of the spreading code; bandpass filters 83 and 84 for extracting only correlation detection signals from the products; a carrier frequency error compensator 208 for compensating the filtered output signals with a carrier frequency error signal detected by an automatic frequency control circuit; an adder 57 for summing in the opposite phase the correlation detection signal associated with an advanced phase replica and the correlation detection signal associated with a retarded phase replica; a loop filter 58 for averaging the phase error of the correlation detection; a multiplier 111 for performing correlation detection using a replica in phase with the spreading code included in the received signal; an integral-dump circuit 112 for integrating the output signal of the multiplier 111 over M chip intervals; an automatic frequency control Circuit 213 for detecting the carrier frequency error from the output signal of the integral-dump circuit to compensate the carrier frequency error; a demodulator 113 for making decision of the received data after compensating the received phase error of the signal obtained by the correlation detection; a multiplier 114 for performing inverse modulation of the decided data using the phase error signal outputted from the loop filter; a voltage controlled clock generator 29 for controlling the clock phase by the phase error signal outputted from the multiplier 114; and the spreading code replica generator 30 driven by the clock signal outputted from the voltage controlled clock generator 29.

The modulated signal, which is down-converted by the fixed oscillation frequency substantially equal to the center frequency of the modulated signal, is deprived of harmonic components, and is multiplied by the replica of the spreading code in phase with the spreading code in the modulated signal, followed by a predetermined length of time integral. Thus, correlation peaks are detected. The correlation detection signal undergoes decision by the demodulation circuit which performs coherent detection or delay detection. On the other hand, the modulated signal is multiplied by the replica of the spreading code with an advanced phase Δ with respect to the spreading code in the modulated signal, and also multiplied by the replica of the spreading code with a retarded phase Δ, thereby eliminating the harmonic components.

The error signals between the correlation associated with the advanced phase replica of the spreading code and the correlation associated with the retarded phase replica of the spreading code are added in the opposite phase by the adder 57, and its output is integrated and averaged by the loop filter 58. This results in an error voltage corresponding to the phase error between the spreading code in the received signal and the replica of the spreading code. Inverse modulation by multiplying the error voltage by the decided data outputted from the demodulator eliminates the error in the phase error signal due to the modulated signal. A delay is inserted after the phase error detection loop in order to match the absolute times of the processings of the phase error detection loop and the data decision loop.

In the conventional DLL, a despread signal includes, a phase error signal component that is a component of an error between the center frequency of the received signal and the frequency of the local oscillator of the quadrature detector. The despread signal also includes data modulation components and vestigial components of a carrier signal component. To eliminate the carrier frequency offset component and the data modulation components, the despread signal may be squared by a square-law detector. This, however, will increase noise components because they are also squared, and the noise components will be added to the chip phase error, thereby increasing phase jitter.

Accordingly, it is necessary to obviate the square-law detector to prevent the noise component from increasing. In view of this, the present embodiment eliminates the carrier frequency offset component from the despread signal by the AFC, and removes the data modulation component by inversely modulating the demodulated and detected signal into the despread signal.

Since the quasi-coherent detected signal includes a carrier offset signal, the detected signal is involved with phase rotations. Consequently, the carrier offset signal must be removed. This is achieved by detecting, by the automatic frequency control circuit 213, the offset component of the carrier signal from the correlation peaks in the data decision loop, and by correcting the two correlation detected signals of the chip phase error detection loop by the carrier offset signal in the opposite phase directions.

SUPPLEMENTS

Figure 8:
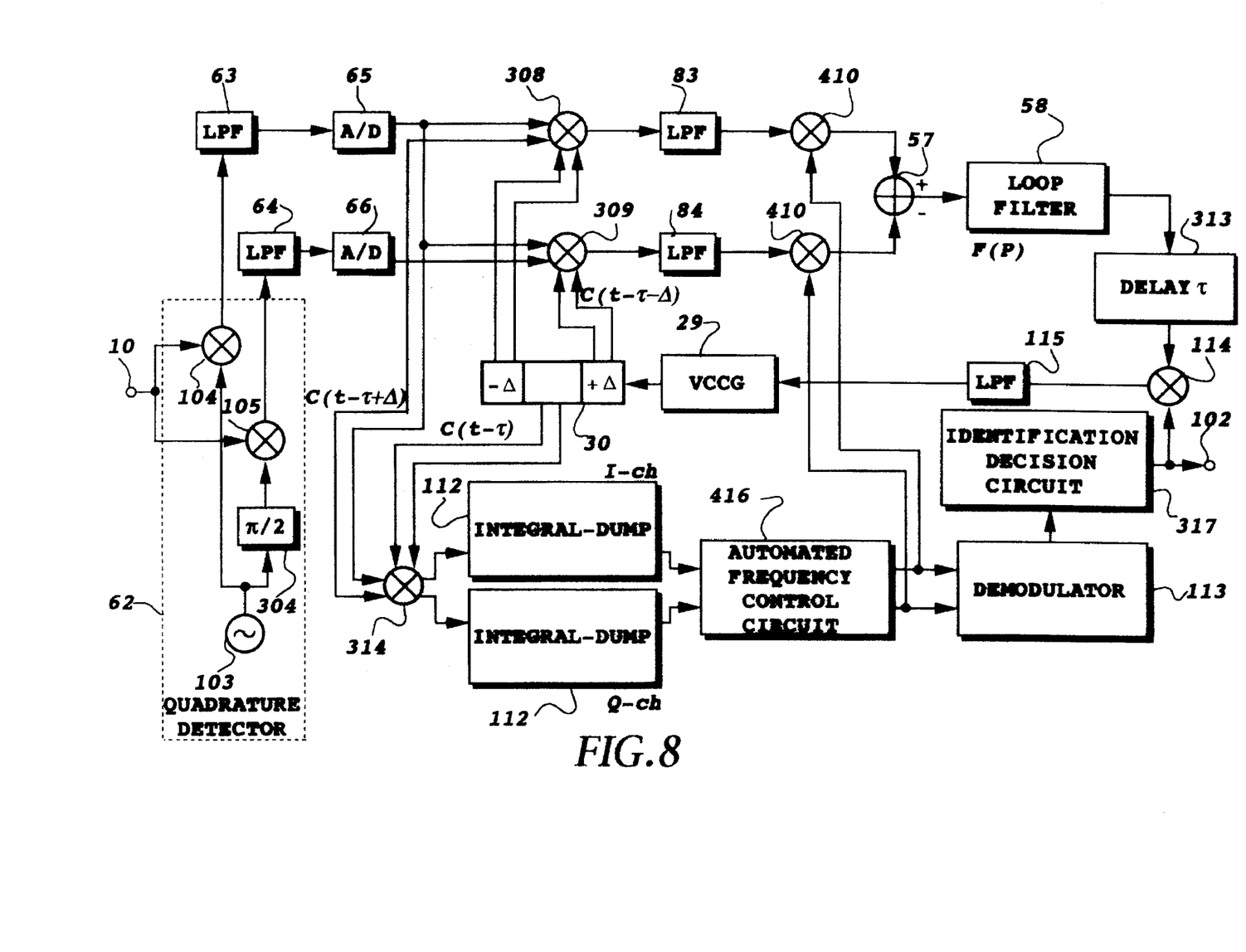
FIG. 8 is a block diagram showing another embodiment of a correlation detector in accordance with the present invention.

FIG. 8 is a block diagram showing detailed hardware of the correlation detector described in the second embodiment. In this figure, the same elements are designated by the same reference numerals as in FIG. 7. In FIG. 8, the reference numerals 304 designates a 90-degree phase shifter, 65 and 66 designate A/D converters, 308 and 309 designate complex multipliers, 313 designates a delay circuit, 314 designates a complex multiplier, and 317 designates a decision circuit. The reference numeral 410 designates a carrier frequency error compensation circuit, and 416 designates an automatic frequency control circuit.

In the correlation detector, a received IF modulated signal is quadrature-detected by the quadrature detector. The quadrature-detected I and Q channel signals are deprived of harmonic components, and are converted into digital values by the A/D converters 65 and 66, followed by the correlation detection by applying complex signal processings on I (In-phase) and Q (Quadrature) components. The correlation detection is carried out by complex multiplication of the modulation spread signal by the I and Q components of the replicas of the spreading code. The two replicas of the spreading code is the same if the in-phase and quadrature components of the primary modulated signal are spread by the same spreading code.

The operation will now be described when the primary modulation is QPSK and the secondary modulation is BPSK. The data to be modulated are primary modulated independently by binary data which are independently set for I and Q channels (QPSK modulation). The I and Q channel data are spread (secondary modulated) by the same spreading codes. The input signal to the receiver is expressed by the following equation.

$$s(t) = \sqrt{S} \ c(t-\tau_t) \times \{m_1(t-\tau_t)\sin[\Delta\omega_0 t + \Delta\theta(t)] + \quad (16)$$

$$m_2(t-\tau_t)\cos[\Delta\omega_0 t + \Delta\theta(t)]\}$$

The signals after multiplying the input signal of equation (3) by the replicas of the spreading code at the receiver will be expressed as follows if a conventional calculation method is applied.

$$e_\pm(t) = \quad (17)$$

$$\sqrt{S} \ \overline{K_m c(t-\tau_t) c(t-\hat{\tau}_t \pm \delta)} \ \{m_1(t-\tau_t)\sin[\Delta\omega_0 t + \Delta\theta(t)] +$$

$$m_2(t-\tau_t)\cos[\Delta\omega_0 t + \Delta\theta(t)]\} + \sqrt{S} \ K_m[c(t-\tau_t)c(t-\hat{\tau}_t \pm \delta) -$$

$$\overline{c(t-\tau_t)c(t-\hat{\tau}_t \pm \delta)}] \times \{m_1(t-\tau_t)\sin[\Delta\omega_0 t + \Delta\theta(t)] +$$

$$m_2(t-\tau_t)\cos[\Delta\omega_0 t + \Delta\theta(t)]\} + K_m c(t-\hat{\tau}_t \pm \delta) n_j(t)$$

The chip phase error signal at the output of the loop filter is expressed by the following equation.

$$e(t) = y_-^2(t) - y_+^2(t) = SK_m^2\{\hat{m}_1^2(t-\tau_t)\} + \hat{m}_2^2(t-\tau_t) D(\epsilon_t) + K_m^2 n_e(t, \epsilon) \quad (18)$$

As shown by equation (18), since modulated signal powers of individual symbol components are multiplied by the phase error signal in the primary QPSK modulation, the primary modulated signal components can be eliminated by inversely modulating the I and Q components of the data after decision into the phase error signal.

INDUSTRIAL APPLICABILITY

As described above in detail, according to the present invention, the correlation detection during the acquisition phase which requires a high speed synchronization is carried out in the initial acquisition circuit using a matched filter, and the correlation detection during the tracking phase which requires power saving rather than high speed synchronization is performed by the sliding correlation detector. This makes it possible to achieve the high speed acquisition, and power saving during the tracking because the power consumption of the initial acquisition circuit during the tracking is negligible.

In addition, according to the present invention, since the tracking loop of the received chip phase eliminates the primary modulated signal components which are included in the phase error signal of the replica signals, components only depending on the crosscorrelation can be extracted. This makes high accuracy tracking possible.

What is claimed is:

1. Synchronizing apparatus including a tracking means for maintaining synchronization between a received signal and a despreading code by using a correlation between the received signal and the despreading code, the received signal being CDMA spread and received by a receiver, and the despreading code being used for despreading the received signal, said tracking means comprising:

replica generating means for generating a phase advanced replica of a CDMA spreading code with an advance phase with respect to said received signal, a phase retarded replica of the CDMA spreading code with a retarded phase with respect to said received signal, and a phase synchronized replica of the CDMA spreading code with synchronized phase with respect to said received signal first multiplication means for multiplying said received signal by said phase advanced replica;

second multiplication means for multiplying said received signal by said phase retarded replica;

a first filter for extracting from an output signal of said first multiplication means a first correlation detection signal indicating a correlation between said phase advanced replica and said received signal;

a second filter for extracting from an output signal of said second multiplication means a second correlation detection signal indicating a correlation between said phase retarded replica and said received signal;

carrier frequency error compensation means for compensating for a carrier frequency error associated with said first and second correlation detection signals;

addition means for summing in opposite phase said first and second correlation detection signals, which have been compensated by said carrier frequency error compensation means;

averaging means for averaging an output signal of said addition means along a time axis;

third multiplication means for multiplying said received signal by said replica in synchronism with said received signal;

integral means for integrating an output signal of said third multiplication means over M chip intervals;

automatic frequency control means for detecting said carrier frequency error from an output signal of said integral means, and for compensating for said carrier frequency error;

decision means for outputting a decided signal of received data by performing received phase error compensation on the output signal of said integral means;

inverse modulation means for inversely modulation an output signal of said averaging means by said decided signal; and clock generating means for outputting a clock signal whose phase is controlled by a phase error signal outputted from said inverse modulation means, wherein said replica generating means generates said replica in accordance with said clock signal generated by said clock generating means.

2. The synchronizing apparatus as claimed in claim 1, further comprising:

initial acquisition means including tapped storing means for storing said received signal of at least one spreading code interval long, tap coefficient means for storing said despreading code, fourth multiplication means for multiplying individual chips stored in said tapped storing means by stored patterns of said despreading code stored in said tap coefficient means, and second addition means for summing outputs of said fourth multiplication means; and switching means for supplying said received signal to said initial acquisition means when a phase difference between said received signal and said despreading code is greater than a predetermined value, and for supplying said received signal to said tracking means when said phase difference is smaller than said predetermined value.

3. CDMA communication apparatus including a tracking means for maintaining synchronization between a received signal and a despreading code by using a correlation between the received signal and the despreading code, the received signal being CDMA spread and received by a receiver, and the despreading code being used for despreading the received signal, said tracking means comprising:

replica generating means for generating a phase advanced replica of a CDMA spreading code with an advanced phase with respect to said received signal, a phase retarded replica of the CDMA spreading code with a retarded phase with respect to said received signal, and a phase synchronized replica of the CDMA spreading code with synchronized phase with respect to said received signal;

first multiplication means for multiplying said received signal by said phase advanced replica;

second multiplication means for multiplying said received signal by said phase retarded replica;

a first filter for extracting from an output signal of said first multiplication means a correlation detection signal indicating a correlation between said phase advanced replica and said received signal;

a second filter for extracting from an output signal of said second multiplication means a correlation detection signal indicating a correlation between said phase retarded replica and said received signal;

third multiplication means for multiplying said received signal by said replica in synchronism with said received signal;

integral means for integrating an output signal of said third multiplication means over M chip intervals;

automatic frequency control means for detecting said carrier frequency error from an output signal of said integral means, and for compensating for said carrier frequency error;

carrier frequency error compensation means for compensating for a carrier frequency error associated with outputs of said first and second correlation detection signals;

addition means for summing in opposite phase said first and second correlation detection signals, which have been compensated by said carrier frequency error compensation means;

averaging means for averaging an output signal of said addition means along a time axis;

decision means for outputting a decided signal of received data by performing received phase error compensation on the output signal of said integral means;

inverse modulation means for inversely modulating an output signal of said averaging means by said decided signal; and clock generating means for outputting a clock signal whose phase is controlled by a phase error signal outputted from said inverse modulation means, wherein said replica generating means generates said replica in accordance with said clock signal generated by said clock generating means.

4. The CDMA communication apparatus as claimed in claim 3, further comprising:

initial acquisition means including tapped storing means for storing said received signal of at least one spreading code interval long, tap coefficient means for storing said despreading code, fourth multiplication means for multiplying individual chips stored in said tapped storing means by stored patterns of said despreading code stored in said tap coefficient means, and second addition means for summing outputs of said fourth multiplication means; and switching means for supplying said received signal to said initial acquisition means when a phase difference between said received signal and said despreading code is greater than a predetermined value, and for supplying said received signal to said tracking means when said phase difference is smaller than said predetermined value.

5. A synchronizing method including a tracking step of maintaining synchronization between a received signal and a despreading code by using a correlation between the received signal and the despreading code, the received signal being CDMA spread and received by a receiver, and the despreading code being used for despreading the received signal, said tracking step comprising the steps of:

generating a phase advanced replica of a CDMA spreading code with an advance phase with respect to said received signal, a phase retarded replica of the CDMA spreading code with a retarded phase with respect to said received signal and a phase synchronized replica of the CDMA spreading code with synchronized phase with respect to said received signal;

multiplying said received signal by said phase advanced replica;

extracting, from products of the multiplications, correlation detection signals indicating correlations between said replicas and said received signal;

compensating for a carrier frequency error associated with said two correlation detection signals;

adding in opposite phase said two correlation detection signals whose carrier frequency error is compensated;

averaging a summed result along a time axis;

multiplying said received signal by said replica in synchronism with said received signal;

integrating the product over M chip intervals;

detecting said carrier frequency error from the integrated signal, and for compensating for said carrier frequency error;

outputting a decided signal of received data by performing received phase error compensation on the integrated signal;

inversely modulating the averaged summed result by said decided signal, thereby generating a phase error signal; and generating a clock signal whose phase is controlled by said phase error signal, wherein said replica is generated in accordance with said clock signal.

6. The synchronizing method as claimed in claim 5, further comprising:

an initial acquisition step of storing said despread code, storing said received signal of at least one spreading code interval long, multiplying individual chips of said received signal by individual patterns of said despreading code, and summing the products; and switching step of performing initial acquisition of said received signal in said initial acquisition step when a phase difference between said received signal and said despreading code is greater than a predetermined value, and of tracking said received signal in said tracking step when said phase difference is smaller than said predetermined value.

7. A CDMA communication system including receivers, each of the receivers being provided with a tracking means for maintaining synchronization between a received signal and a despreading code by suing a correlation between the received signal and the despreading code, the received signal being CDMA spread and received by the receiver, and the despreading code being used for despreading the received signal, said tracking means comprising:

replica generating means for generating a phase advanced replica of a CDMA spreading code with an advance phase with respect to said received signal, a phase retarded replica of the CDMA spreading code with a retarded phase with respect to said received signal, and a phase synchronized replica of the CDMA spreading code with synchronized phase with respect to said received signal;

first multiplication means for multiplying said received signal by said phase advanced replica;

second multiplication means for multiplying said received signal by said phase retarded replica;

a first filter for extracting from an output signal of said first multiplication means a correlation detection signal indicating a correlation between said phase advanced replica and said received signal;

a second filter for extracting from an output signal of said second multiplication means a correlation detection signal indicating a correlation between said phase retarded replica and said received signal;

third multiplication means for multiplying said received signal by said replica in synchronism with said received signal;

integral means for integrating an output signal of said third multiplication means over M chip intervals;

automatic frequency control means for detecting said carrier frequency error from an output signal of said integral means, and for compensating for said carrier frequency error;

carrier frequency error compensation means for compensating for a carrier frequency error associated with said first and second correlation detection signals;

addition means for summing in opposite phase said output of said first filter and said output of said second filter, which have been compensated by said carrier frequency error compensation means;

averaging means for averaging an output signal of said addition means along a time axis;

decision means for outputting a decided signal of received data by performing received phase error compensation on the output signal of said integral means;

inverse modulation means for inversely modulation an output signal of said averaging means by said decided signal; and clock generating means for outputting a clock signal whose phase is controlled by a phase error signal outputted from said inverse modulation means, wherein said replica generating means is driven by said clock signal generated by said clock generating means.

8. The CDMA communication system as claimed in claim 7, further comprising:

initial acquisition means including tapped storing means for storing said received signal of at least one spreading code interval long, tap coefficient means for storing said despreading code, fourth multiplication means for multiplying individual chips stored in said tapped storing means by stored patterns of said despreading code stored in said tap coefficient means, and second addition means for summing outputs of said fourth multiplication means; and switching means for supplying said received signal to said initial acquisition means when a phase difference between said received signal and said despreading code is greater than a predetermined value, and for supplying said received signal to said tracking means when said phase difference is smaller than said predetermined value.

9. A receiver for a CDMA communication system including a plurality of the receivers, each of the receivers being provided with a tracking means for maintaining synchronization between a received signal and a despreading code by suing a correlation between the received signal and the despreading code, the received signal being CDMA spread and received by the receiver, and the despreading code being used for despreading the received signal, said tracking means in the receiver comprising:

replica generating means for generating a phase advanced replica of a CDMA spreading code with an advance phase with respect to said received signal, a phase retarded replica of the CDMA spreading code with a retarded phase with respect to said received signal, and a phase synchronized replica of the CDMA spreading code with synchronized phase with respect to said received signal;

first multiplication means for multiplying said received signal by said phase advanced replica;

second multiplication means for multiplying said received signal by said phase retarded replica;

a first filter for extracting from an output signal of said first multiplication means a correlation detection signal indicating a correlation between said phase advanced replica and said received signal;

a second filter for extracting from an output signal of said second multiplication means a correlation detection signal indicating a correlation between said phase retarded replica and said received signal;

third multiplication means for multiplying said received signal by said replica in synchronism with said received signal;

integral means for integrating an output signal of said third multiplication means over M chip intervals;

automatic frequency control means for detecting said carrier frequency error from an output signal of said integral means, and for compensating for said carrier frequency error;

carrier frequency error compensation means for compensating for a carrier frequency error associated with said first and second correlation detection signals;

addition means for summing in opposite phase said output of said first filter and said output of said second filter, which have been compensated by said carrier frequency error compensation means;

averaging means for averaging an output signal of said addition means along a time axis;

decision means for outputting a decided signal of received data by performing received phase error compensation on the output signal of said integral means;

inverse modulation means for inversely modulation an output signal of said averaging means by said decided signal; and clock generating means for outputting a clock signal whose phase is controlled by a phase error signal outputted from said inverse modulation means, wherein said replica generating means is driven by said clock signal generated by said clock generating means.

* * * * *